March 26, 1940.   N. H. WAGNER, JR   2,194,921
HORSE BOOT
Filed April 19, 1939   2 Sheets-Sheet 1
FIG. I.
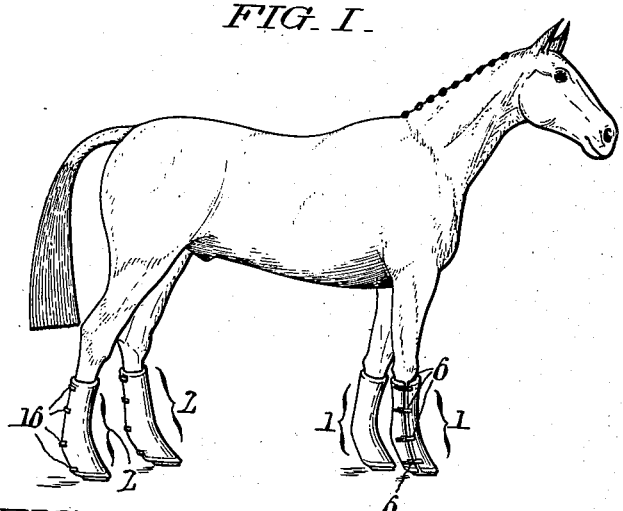
FIG. II.
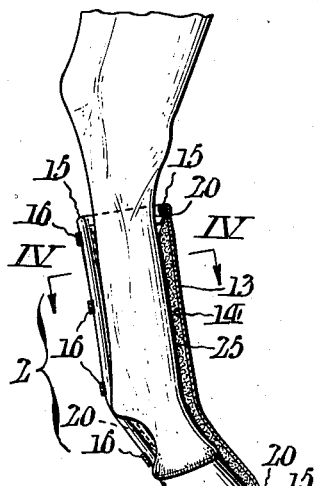
FIG. III.
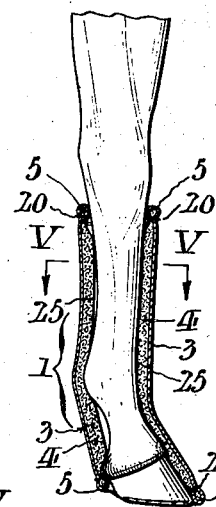
FIG. IV.
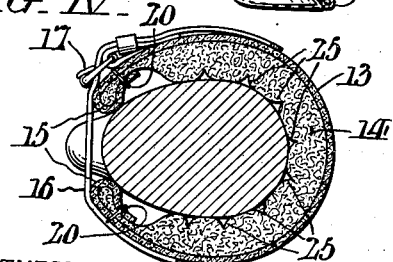
FIG. V.
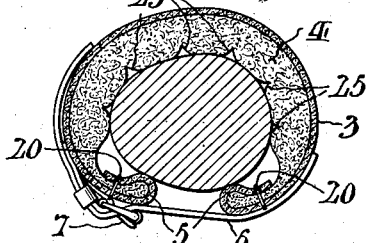
WITNESSES:
Thomas W. Kerr, Jr.
Woodrow Stevenson
INVENTOR:
Nicholas H. Wagner, Jr.,
BY Paul & Paul
ATTORNEYS.

March 26, 1940. N. H. WAGNER, JR 2,194,921
HORSE BOOT
Filed April 19, 1939 2 Sheets-Sheet 2
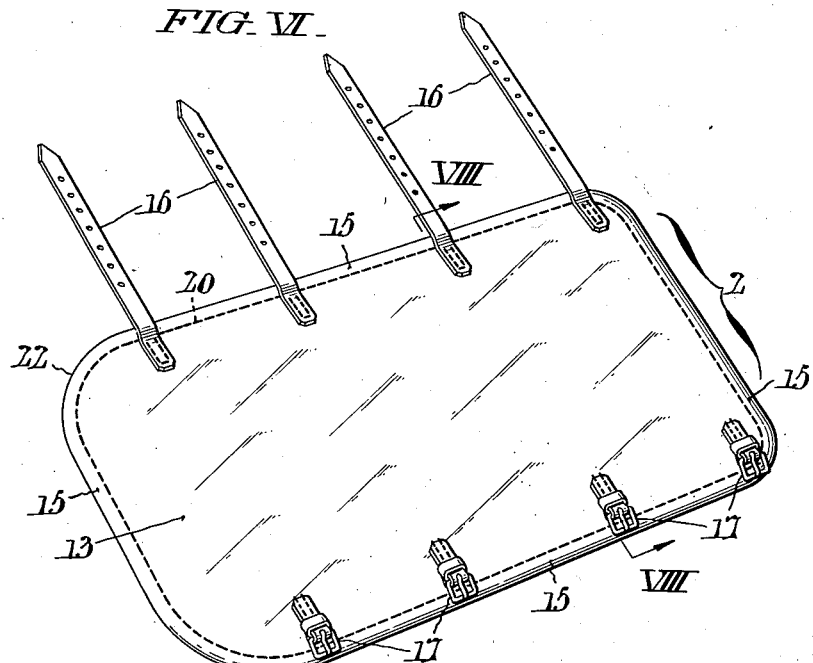
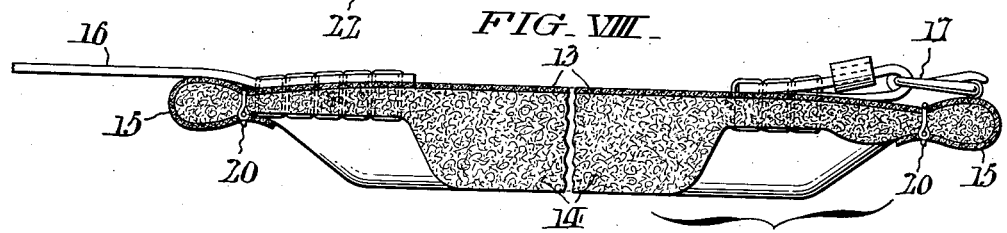
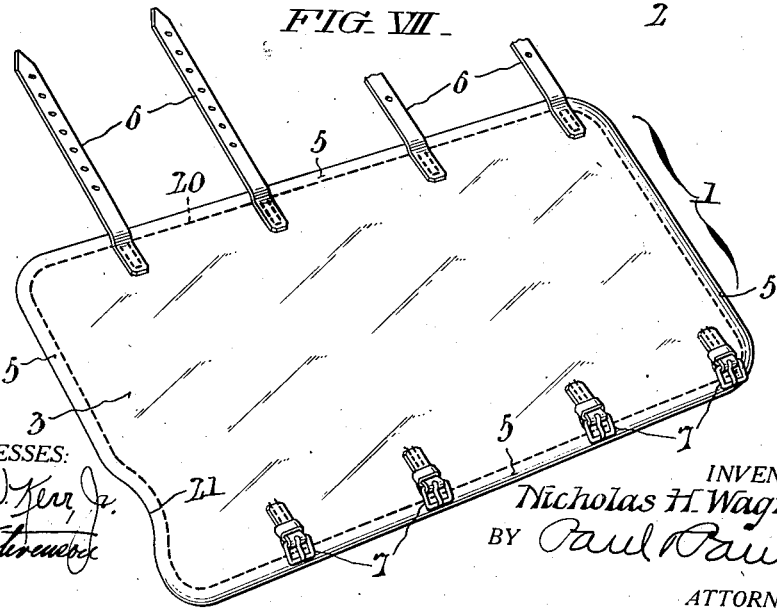
INVENTOR:
Nicholas H. Wagner, Jr., Patented Mar. 26, 1940

2,194,921

UNITED STATES PATENT OFFICE 2,194,921

HORSE BOOT

Nicholas H. Wagner, Jr., Media, Pa.

Application April 19, 1939, Serial No. 268,683

5 Claims. (Cl. 54—82)

This invention relates generally to horse boots and more particularly to horse boots suitable for the protection of a horse's legs when the horse is being transported by van or by train. Horse boots have been produced for various purposes, such as bracing the leg, bandaging the leg, and protecting the leg in polo playing. But the art does not provide an inexpensive boot suitable for protection in the transportation of horses which may be safely put on the horse by a stablehand without binding the horse's leg. It is also important that horse boots for use in transportation have a ventilation feature which will not over-cool the legs of a warm horse.

It is well known that the injuries to horses' legs require an extended period for healing and during such periods the use of the horse is frequently restricted if not completely barred. It is common experience that horses' legs are frequently injured when in transportation; the jolting and swaying of an automobile van causes the horse to kick himself when losing and recovering his balance. Drivers of horse vans are presumably aware of the importance of smooth driving, but contingencies arise during most trips requiring a sudden application of brakes or sharp swerves. It is, therefore, important to protect horses in transportation from the dangers of kicking themselves.

In order to mitigate these dangers, many horse owners follow the practice of having the horse's shoes removed while in transportation. This expedient has many disadvantages, among which are expense and trouble in shoeing and unshoeing.

Therefore, the principal object of this invention is the provision of inexpensive horse boots suitable for the protection of a horse's legs while in transportation from the horse's iron shoes. Another object is the provision of horse boots which will maintain a proper adjustment in place on the horse's leg without binding or interfering with the freedom of muscle action during extended periods of transit. Another object is the provision of a boot which may be applied by an amateur without danger from the ill effects of improper binding and restricting of the blood vessels and muscles. Still further objects and advantages will become apparent from the following description of a preferred embodiment of this invention, reference being had to the accompanying drawings.

Fig. I shows a horse equipped with front and rear boots embodying this invention.

Fig. II is a view of the rear leg of a horse with a boot applied thereto and shown in vertical section.

Fig. III is a view similar to Fig. II showing the application to the front leg.

Fig. IV is an enlarged plan section taken as indicated by the lines IV—IV of Fig. II.

Fig. V is an enlarged plan section taken as indicated by the lines V—V of Fig. III.

Fig. VI is a perspective view showing one of the rear horse boots of Fig. I in the unrolled and flat state.

Fig. VII is a perspective view showing one of the front horse boots of Fig. I.

Fig. VIII is an enlarged transverse section taken as indicated by the lines VIII—VIII of Fig. VI.

In the following detailed description of the preferred embodiment of this invention shown in the drawings, specific terms will be employed for the sake of clarity, but it is to be understood that such terms are used in a descriptive sense and not for the purpose of limitation. Each specific term is intended to include all technical equivalents which operate in a similar manner to accomplish a similar purpose.

Referring to Fig. I, it will be seen that front boots 1 and rear boots 2 differ to some extent in their design. The open space where the front boot 1 is fastened must be kept at the side of the leg because of the danger to the back of the front leg from the rear hoofs of the horse. The rear boot 2 opens down the back. It has been found that this difference in design has certain advantages due to the difference in form and movement of the front and rear legs of a horse. Before taking up the value of these differences in design between front and rear boots, it is desirable that detailed structure of the boots be explained.

The front boot 1 comprises generally a flexible outer covering 3, and inner lining 4 attached to the outer covering 3, a stiffening roll 5 formed around the edges of the boot 1, straps 6 and buckles 7. Similarly, the rear boot 2 includes covering 13, inner lining 14, a stiffening roll 15, straps 16 and buckles 17. For the sake of clarity, the front boot will be described in detail and the special features of the rear boot 2 will then be described later.

It has been found that sheepskin provides an inexpensive and quite satisfactory material for the outer covering 3. Of course, some other material of the same general characteristics could be substituted for sheepskin. It is important that the outer covering 3 be flexible and soft and in no sense rigid or stiff. However, the outer covering 3 must be tough enough to protect from the cutting corners of iron horse shoes and to insure that the boot 1 maintain its form in use. It is important that the boot 1 does not cling to the leg and thereby impair circulation or free muscle action in the horse's leg. Therefore, a certain amount of inherent resiliency should always be present in the boot when in place around a horse's leg.

The size of the boot 1 and, therefore, the covering 3 is governed by the general size of horse to be accommodated. The boot 1 should extend from a point shortly below the knee to a point just above the lower edge of the hoof. As will be explained later, the lower edge of the boot 1 should be coterminous with the lower edge of the hoof to provide a guard at that point.

The lining 4 is made of a springy and resilient felt and should be from three-quarters to one inch in thickness. The inner lining 4 must be thick enough to form a pronounced fluting on its inner surface when in place on the horse. After the lining 4 has been cut out according to the shape of the covering 3, the lining 4 is then strongly sewed to the covering 3 forming the roll 5 as hereinafter explained. The lining 4 is cut to a smaller size all around than the covering 3 to allow for the formation of the stiffening roll 5 extending all around the edges of the boot 1. It is important to confine all fastening between the outer covering 3 and the inner lining 4 to near the edges of the boot 1 in order to cause corrugations to develop easily on the inner surface by bending the boot 1 around the horse's leg.

The stiffening roll 5 is formed by folding the edge portion of the covering 3 back over the edge of the lining 4. It is important that this rolling back of the covering 3 over the lining 4 compress the edge of the lining 4 and that a tight sewing operation be performed at 20 without losing this compression. In this way, the desirable stiffness is provided for the support of the boot 1 and for the preservation of its shape without the use of undesirable stiffening wires or battens which should be eliminated.

It is also important that the formation of the roll 5 with the associated sewing operation at 20 be performed in the flat position to insure the formation of pronounced corrugations or ventilation channels 25 when the boot 1 is curved around a leg. This inherent flexibility insures that when the boot 1 is put on the horse, there will be a tendency in the boot 1 to return to the flat position which, in combination with the corrugations 25 materially reduces any tendency of the boot to cling to or bind the horse's leg. Amateurs and unskilled stablehands may then apply these boots without any great risk of causing impairment to muscle action or to the circulation of the blood during frequently extended periods of transit. This pronounced vertical fluting or corrugation of the heavy felt lining 4 when the boot 1 is in position on the horse's leg is important for more than one reason. First, the fluting forms the ventilation channels 25. This ventilation feature prevents excess heating of a horse's legs when the boots are in use. Second, the boot 1 is more effective in absorbing blows and kicks because of the presence of the deep corrugations. Third, the danger from binding and impairing circulation is greatly reduced because of the ventilation grooves 25.

This ventilation through the vertical channels 25 provides a warm ventilation and does not cause any undesirable cooling of a heated horse. As a further ventilation aid the vertical edges of the boot 1 are designated to be separated when the boot is in place on a horse's leg. As pointed out above, the open space on the front boot 1 must not be in the back of the front leg.

The straps 6 with corresponding buckles 7 are provided for holding the boot 1 in place on the leg. These straps 6 and buckles 7 are four in number and are stoutly sewed to the covering 3. It is important that one strap 6 and buckle 7 be positioned so that it will be below the fetlock when in place on the leg. This lower strap 6 aids in preventing the boot 1 from slipping up the horse's leg and completely exposing the hoof edge, because this portion of the boot may be drawn into the usual inwardly curved area below the fetlock and above the hoof.

The roll 5 positioned near the lower edge of the hoof reduces the usual destructive effect of the fully exposed iron shoe not shown. In order to further provide for keeping the lower edge of the front boot 1 substantially coterminous with the lower edge of the hoof, a curved indentation 21 is formed in the bottom edge of the front boot to bring the roll 5 at the back of the boot 1 up under the projection usually present around the upper edge of a horse's hoof. This indentation 21 also lifts the back edge of the boot 1 clear of the hoof so that there will be no destructive stepping on the boot 1. The sensitive frog at the rear of the upper part of the hoof then fits into the hollow formed by the tight sewing at 20 between the roll 5 and the body of the boot 1 as shown in Fig. III. This aids to some extent in keeping the boot 1 in position on the horse's leg. Of course, it will be understood from Fig. VII that the curved indentation 21 will be on the opposite side of the longitudinal center line of the boot 1 since this boot is used on the right foreleg.

This brings us to the rear boot 2 which is constructed in the same manner as the front boot 1 but with certain differences in shape. The rear boot 2 extends from a point below the hock to the lower hoof edge. Because of the greater angularity in the ankle structure of a rear leg, the lower corners of the rear boot 2 are curved to a greater extent than the lower corners of the front boot 1. These pronounced curves lift the back edge of the boot 2 as does the indentation 21 in the case of the front boot 1. The rear boot 2 is designed to have the straps 16 and buckles 17 fasten at the back of the horse's leg instead of the side as is the case with front boot 1. Because of this angularity in the rear ankle structure, the fetlock is much more prominent and the rear boot 2 may be held in place completely by means of the lower fastening strap 16 with associated buckle 17 which comes below the fetlock when the boot is in place on the leg. Also because of the greater angularity in the rear ankle structure, it has been found to be undesirable to try to bring the roll 15 on the lower portion of the boot 2 into abutting contact with the projection at the upper edge of the hoof as in the case of the front boot 1. It will be seen that by rounding the lower corners 22 of the rear boot 2 and having the vertical edges at the rear of the horse's leg rather than at the side, there is provided a nicely fitting boot 2 which will lie in place after it has been put on the horse's leg.

This invention, therefore, provides an inexpensive horse boot which is particularly suitable for the protection of horses' legs while in transportation. The boots may easily be applied to the horse by persons having no knowledge of the danger that may result from improper binding of a horse's leg. The proper degree of stiffness is provided in the boot by means of the fluted inner surface and the tightly rolled edge which also functions as a guard at the lower hoof edge.

While the preferred embodiment of this invention illustrated in the drawings has been described above in considerable detail, it will be clear to one skilled in the art that certain changes and modifications may be made without departing from the spirit of the invention as hereinafter claimed.

Having thus described my invention I claim:

1. A horse boot having a flexible outer covering, a soft relatively thick compressible inner lining attached to said covering at the edge portions only, a stiffening roll formed around the edges of said covering and attached lining, and fastening means for holding said boot in place around a horse's leg with the lower rolled edge of the boot substantially coterminous with the bottom edge of the horse's hoof.

2. The invention of claim 1 wherein said stiffening roll is formed with the edge of the lining held in a state of compression by the folded over portion of the outer covering whereby the boot is given a stiff flexibility without rigidity.

3. A horse boot having a flexible sheepskin outer covering, a thick compressible felt inner lining attached to said covering at the edge portions only, a stiffening roll formed around the edges of said boot, said stiffening roll comprising a portion of the outer covering rolled around the compressed edges of said lining and stitched in place, and adjustable straps for holding said boots in place around a horse's leg with the lower rolled edge substantially coterminous with the lower edge of the horse's hoof.

4. The invention of claim 3 wherein the lower corners of said boot are rounded off to provide a rear boot and one of said adjustable straps is positioned to coincide with the inwardly curved portion of a horse's leg below the fetlock and above the hoof.

5. The invention of claim 3 wherein a curved indentation is provided in the lower edge of said boot to bring the roll of the indented portion of said lower edge immediately below the projecting portion of the upper rear edge of a horse's hoof.

NICHOLAS H. WAGNER, Jr.